United States Patent
Huijser

(10) Patent No.: US 9,608,470 B2
(45) Date of Patent: Mar. 28, 2017

(54) BANK CARD PRESENCE DETECTION TO AVOID A WIRELESS CHARGER DEMAGNETIZING A BANK CARD

(71) Applicant: NXP B.V., Eindhoven (NL)

(72) Inventor: Jan Paulus Freerk Huijser, Wy Chen (NL)

(73) Assignee: NXP B.V., Eindhoven (NL)

( * ) Notice: Subject to any disclaimer, the term of this patent is extended or adjusted under 35 U.S.C. 154(b) by 141 days.

(21) Appl. No.: 14/091,585

(22) Filed: Nov. 27, 2013

(65) Prior Publication Data

US 2015/0145471 A1    May 28, 2015

(51) Int. Cl.
| | |
|---|---|
| H02J 7/00 | (2006.01) |
| H02J 7/02 | (2016.01) |
| B60L 11/18 | (2006.01) |
| G06K 19/077 | (2006.01) |
| H02J 5/00 | (2016.01) |
| H04B 5/00 | (2006.01) |

(52) U.S. Cl.
CPC .............. *H02J 7/025* (2013.01); *B60L 11/182* (2013.01); *G06K 19/07749* (2013.01); *H02J 5/005* (2013.01); *H04B 5/0037* (2013.01)

(58) Field of Classification Search
USPC .......................................................... 320/108
See application file for complete search history.

(56) References Cited

U.S. PATENT DOCUMENTS

| | | | |
|---|---|---|---|
| 2007/0182367 A1 | 8/2007 | Partovi | |
| 2008/0164839 A1 | 7/2008 | Kato et al. | |
| 2009/0278666 A1 | 11/2009 | Yoda et al. | |
| 2010/0156347 A1* | 6/2010 | Lee ......................... | H02J 7/025 320/108 |
| 2010/0301801 A1 | 12/2010 | Andrieu et al. | |
| 2010/0320963 A1 | 12/2010 | Cheng et al. | |
| 2012/0115549 A1 | 5/2012 | Kim et al. | |
| 2012/0205988 A1* | 8/2012 | Tanabe .................... | H02J 7/025 307/104 |
| 2012/0242163 A1 | 9/2012 | Jung et al. | |
| 2014/0191715 A1 | 7/2014 | Wechlin et al. | |
| 2014/0266036 A1* | 9/2014 | Jung et al. .................... | 320/108 |

FOREIGN PATENT DOCUMENTS

DE      102011050655 A1    11/2012

OTHER PUBLICATIONS

Extended European Search Report for application No. 14188984.0 (Apr. 15, 2015).

* cited by examiner

*Primary Examiner* — Eric Lee

(57) ABSTRACT

Various embodiments relate to a method, machine-readable medium, and a system for preventing demagnetization of a magnetically sensitive object comprising detecting, by a first identification sensor at a wireless charging transceiver, a foreign object; determining, by a processor using information from the first identification sensor, whether the foreign object is magnetically sensitive; and responsive to a determination that the foreign object is magnetically sensitive, preventing the wireless charging transceiver from operating.

20 Claims, 3 Drawing Sheets

BANK CARD PRESENCE DETECTION TO AVOID A WIRELESS CHARGER DEMAGNETIZING A BANK CARD

TECHNICAL FIELD

Various exemplary embodiments disclosed herein relate generally to demagnetization avoidance in wireless charging.

BACKGROUND

Wireless charging appears to be a revolutionary way to conveniently charge battery-powered devices. Specifically, handheld and portable electronic devices stand to benefit from the convenience of charging without the needing to connect a hardwire cable directly for charging. An indirect benefit for these devices is the potential removal of a hardware charging port on the exterior of the device, which loosens device design constraints, giving product developers additional creative license in making these handheld devices. There are many wireless charging techniques, but all currently have the ability to interfere with magnetically stored data on devices.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to method for preventing demagnetization of a magnetically sensitive object, the method including the steps of detecting, by a first identification sensor at a wireless charging transceiver, a foreign object; determining, by a processor using information from the first identification sensor, whether the foreign object is magnetically sensitive; and responsive to a determination that the foreign object is magnetically sensitive, preventing the wireless charging transceiver from operating.

Further, various exemplary embodiments relate to non-transitory machine-readable medium capable of storing instructions, wherein said instructions, when executed by a processor, cause the processor to perform the steps including receiving a detection of a foreign object from a first identification sensor at a wireless charging transceiver; determining, using information from the first identification sensor, whether the foreign object is magnetically sensitive; and responsive to a determination that the foreign object is magnetically sensitive, preventing the wireless charging transceiver from operating.

Further, various exemplary embodiments relate to system including a first identification sensor; a wireless charging transceiver; and a processor configured to receive a detection of a foreign object from the first identification sensor at a wireless charging transceiver; determine, using information from the first identification sensor, whether the foreign object is magnetically sensitive; and responsive to a determination that the foreign object is magnetically sensitive, prevent the wireless charging transceiver from operating.

Additionally, various exemplary embodiments include further including the step of responsive to a determination that the foreign object is not magnetically sensitive, triggering the wireless charging transceiver to begin operating; further including the steps of determining, by a processor using information from said identification sensor, that the foreign object may be charged, and responsive to a determination that the foreign object may be charged, triggering the wireless charging transceiver to begin operating; wherein the first identification sensor is one of near field communication (NFC) sensor, a radio frequency identification (RFID) sensor, an ultrasound sensor, a Bluetooth transceiver, an optical sensor, and a tactile sensor; wherein the wireless charging transceiver transfers power using an air-core transformer, resonant coupling, or strongly coupled resonators; and wherein determining, by a processor using information from the first identification sensor, whether the foreign object is magnetically sensitive comprises receiving, by the processor, a first information from the first identification sensor, receiving, by the processor, a second information from a second identification sensor, wherein the second identification sensor is a different type of sensor than the first identification sensor, and determining, by the processor, whether the foreign object is magnetically sensitive based on the first information and the second information.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 3:
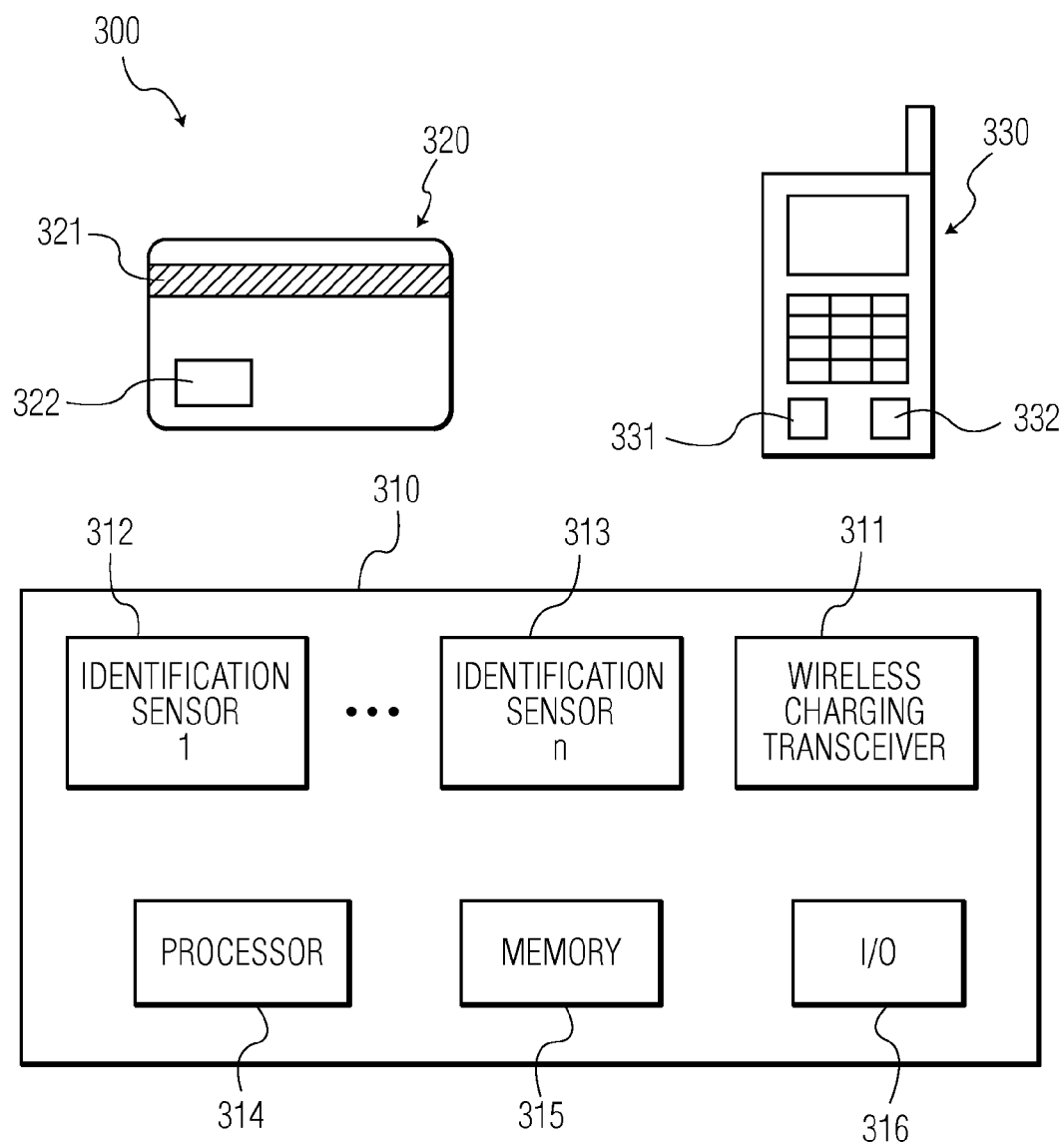
FIG. 3 illustrates an exemplary environment for performing the disclosed processes, including an exemplary wireless charging device.

FIG. 3 illustrates wireless charging device 310 in exemplary environment 300 with bank card 320 and phone 330.

Wireless charging device 310 is depicted having identification sensor 1 312 and identification sensor n 313. This depiction is meant to represent that wireless charging device may have any number of identification sensors, either a single identification sensor or a plurality of identification sensors. These identification sensors may be any one of a NFC sensor, a radio frequency identification (RFID) sensor, an ultrasound sensor, a Bluetooth transceiver, an optical sensor, and a tactile sensor. These sensors collect data to allow processor 314 to make the disclosed determinations. In an exemplary embodiment, the identification sensor is a NFC sensor which uses data from objects' NFC chips, which allow processor 314 to identify objects. However, data from other types of sensors may be used to identify foreign objects. Any sensor may be used that does not produce significant magnetic interference such that operation of the sensor would demagnetize the magnetic strip of a bank card.

Processor 314 has access to memory 315. This allows processor 314 to locally store necessary data for making determinations. Further, memory 315 may store requisite or optional instructions to perform various method steps. Memory 315 may be used to stored relevant identification data or store other data to allow for machine learning in the identification process.

Memory 315 may be volatile or non-volatile. In particular embodiments, memory 315 is random access memory (RAM), a hard drive disc, or a solid state drive. Other types of memory are known and used in the art and may be substituted to achieve the objects of this disclosure.

Wireless charging device 310, while depicted as a single entity, may be developed as a system which may have distinct portions, which may or may not be collocated. For example, identification sensor 1 312 and identification sensor n 313 may be networked devices which communicate with a remote processor to perform the described functions. The disclosure may be implemented as a standalone device. Alternatively, particular embodiments act as devices to connect to existing wireless charging units in order to perform the disclosed processes. Additionally, wireless charging device may utilize the disclosed identification sensor to perform additional functions. For example, wireless charging device 210 may have a NFC sensor which acts as a identification badge reader, in addition to performing the disclosed processes.

Further, wireless charging device 310 may interact with an open or closed network though I/O port 316. This may allow a network to remotely operate wireless charging device 310. A network connection would also allow wireless charging device 310 to utilize network data storage for determinations and remotely log resultant data.

Bank card 320 is depicted as a part of exemplary environment 300 having magnetic strip 321. Bank card 320 is an exemplary magnetically sensitive object. In some embodiments bank card 320 may have NFC chip 322. This allows bank card 320 to be identified as a magnetically sensitive object by a NFC sensor. This represents many credit and banking cards throughout the world. In the United States, most credit cards do not have NFC chips, which is why the disclosed processes do not rely solely on this feature. However, to reiterate, cards having a magnetic strip are not the only magnetically sensitive objects that may be identified. Certain kinds of electronic storage media and other device may be magnetically sensitive.

Phone 330 is depicted as part of exemplary environment 300. Phone 330 has wireless charging transceiver 331 to perform wireless charging. Phone 330 also optionally includes NFC sensor 332, as many smart phones currently do in the market. NFC sensor 332 would allow wireless charging device 310 to identify phone 330 as a device that is compatible with wireless charging. In alternative embodiments Phone 330 utilizes alternative sensors to convey the same information. For example, phone 330 may include a Bluetooth or wireless USB transceiver. Other short range communication technologies are known in the art and may be substituted to perform the same functions.

Figure 1:
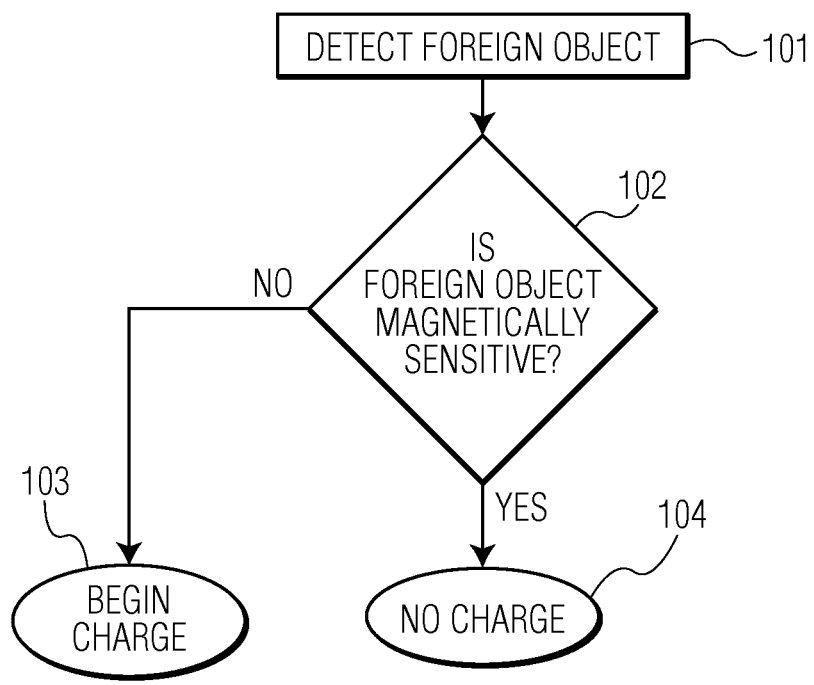
FIG. 1 illustrates an exemplary process for preventing a wireless charging device from interfering with a magnetically sensitive object.

FIG. 1 illustrates an exemplary process for preventing a wireless charging device from interfering with a magnetically sensitive object. The exemplary embodiment of process 100 includes step 101.

At step 101, a foreign object is detected at wireless charging device 310. This detection step may use various sensors (for example, identification sensor 1 312 or identification sensor n 313), individually or in combination. Particularly, any sensor used in the detection step may not interfere with information stored on magnetically sensitive devices.

At step 102 the sensors, alone or in combination, forward data to processor 314, which in turn determines whether the foreign object is magnetically sensitive. In an exemplary embodiment, bank card 320 with a magnetically sensitive magnetic strip 321 and a near field communications (NFC) chip 322 is detected. A NFC sensor on the wireless charging device 310 reads data from NFC chip 322 of bank card 320 and forwards it to processor 314. Processor 314 then determines that the data from NFC chip 322 corresponds to a bank card, which is magnetically sensitive.

After a determination that the foreign object is magnetically sensitive, at step 104, wireless charging transceiver 311 is prevented from being used. This advantageously prevents the powerful electromagnetic signals from wireless charging transceiver 311 from interfering with or erasing the data stored on magnetic strip 321 of bank card 320. In other embodiments with other magnetically sensitive objects, damage will be prevented on the corresponding sensitive parts.

After a determination that the foreign object is not magnetically sensitive, at step 103, wireless charging transceiver 311 is engaged to operate. Depending upon the type of wireless charging used, this typically involves a pairing identification procedure prior to charging. However, the pairing procedure itself uses strong electromagnetic signals which interfere with magnetically sensitive objects. Thus, it is important to prevent both the pairing procedure and the charging process from occurring in the presence of a magnetically sensitive object, such as bank card 320.

In the event that a positive determination of magnetic sensitivity is not possible, the wireless charging transceiver may be engaged in order to efficiently charge devices that cannot assert their lack or magnetic sensitivity.

In an exemplary embodiment, process 100 occurs when wireless charging transceiver 311 is inactive (i.e., wireless charging is not currently happening). However, in alternative embodiments, process 100 may occur during charging to ensure that no foreign objects enter the field of interference created by wireless charging transceiver 311. In those cases, step 104 would deactivate an active wireless charging transceiver. This process may occur periodically, such as every five seconds, every 30 seconds, or every minute. Alternatively, it may happen at random intervals or on a continuous basis. In the instance of a continuous basis, identification sensors constantly search to detect the presence of any foreign objects not being actively charged.

Figure 2:
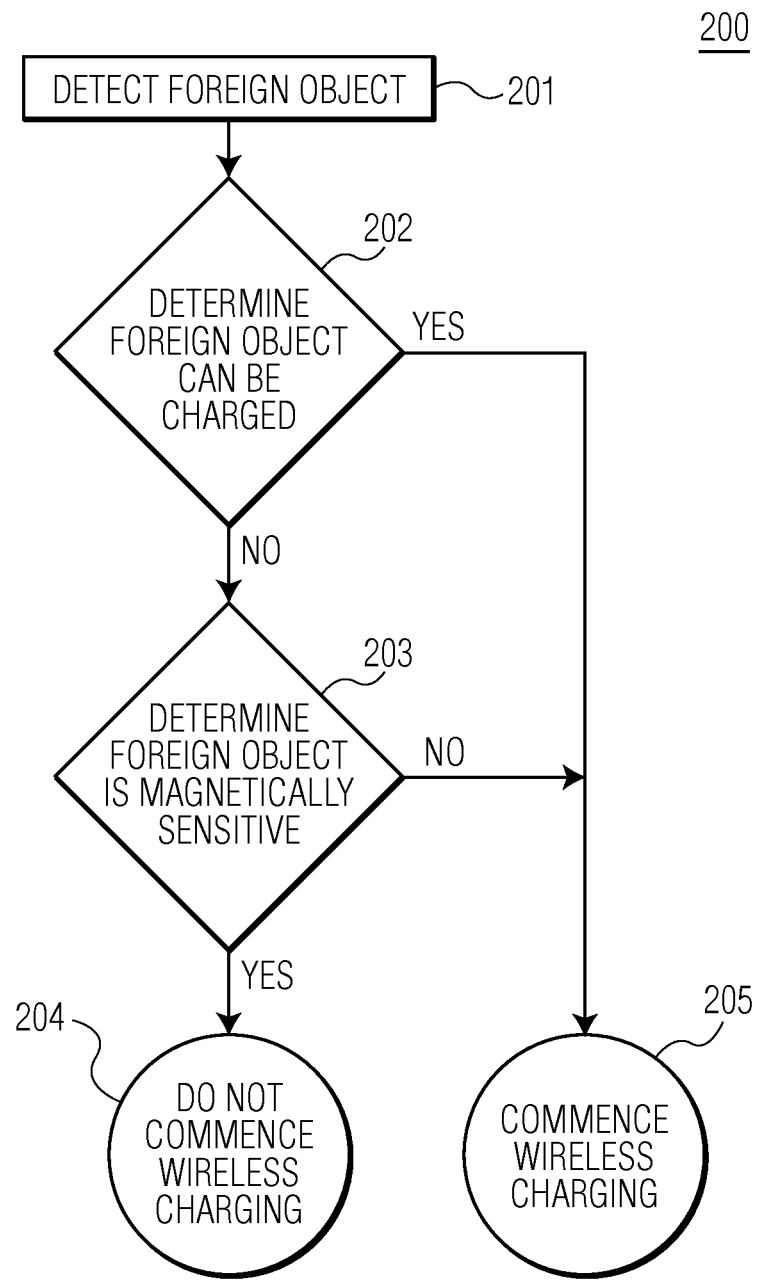
FIG. 2 illustrates another exemplary process for preventing a wireless charging device from interfering with a magnetically sensitive object.

FIG. 2 illustrates another exemplary process for preventing a wireless charging device from interfering with a magnetically sensitive object.

Process 200 begins with step 201. Step 201 is performed similarly to step 101 of process 100 in FIG. 1. Next, at step 202, identification sensors forward data to processor 314.

Processor 314 then determines if the foreign object is an object capable of being wirelessly charged. In an exemplary embodiment, phone 330 includes NFC sensor 332 and wireless charging transceiver 331. An NFC sensor of wireless charging device 310 reads data from NFC sensor 332 of phone 320. Processor 314 then uses the information to determine that the foreign object is a phone with a wireless charging transceiver. In the event that the affirmative identification of a wireless charging object, wireless charging commences at step 205.

However, if step 202 results in no determination that the foreign object can be charged, at step 203, the process 200 attempts to identify that the foreign object is magnetically sensitive. Step 203 is performed similarly to step 102 of process 100 in FIG. 1. Step 203 may be performed in addition to 202, because there are wireless charging objects that may not be able to be positively identified using the identification sensors of wireless charging device 310.

In the event that step 203 results in the identification of a magnetically sensitive object, wireless charging transceiver 311 is prevented from operating at step 204. Otherwise, if step 203 determines that the foreign object is not magnetically sensitive, or if the determination is inconclusive, wireless charging transceiver 311 is engaged at step 205.

The step 202 and step 203 may be performed in any order, depending upon design priorities. For example, step 203, contrary to the depiction of FIG. 2, may be performed prior to step 202. This order would allow the affirmative identification of a magnetically sensitive object as quickly as possible.

The descriptions of process 100 and process 200 may include indications that specific actions are taken when steps 102, 202, and 203 are inconclusive. However, the processes may be performed such that either action may be used as the default action in the event of an inconclusive determination. Depending upon application priorities, the steps may be structured to conservatively assume that the device is magnetically sensitive. In other scenarios it may be advantageous to commence charging as quickly and efficiently as possible, which may result in an assumption that the foreign object is not magnetically sensitive when steps result in inconclusive determinations. Further, inclusive results may result in the repetition of individual steps or entire processes for a finite amount of time or repetitions. In the most conservative cases, the steps are performed in repetition until a definitive determination is made.

It should be appreciated by those skilled in the art that variations to the structure may be made to achieve the same functional results as the cooling components described. Mounting points, component shapes and sizes, and materials used may be altered to adapt the assembly to specific circumstances.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for preventing demagnetization of a magnetically sensitive object, the method comprising the steps of:

detecting, by a first identification sensor at a wireless charging transceiver, a foreign object;

determining, by a processor using information from the first identification sensor, whether data on the foreign object is magnetically sensitive;

responsive to a determination by the processor that the data on the foreign object identifies the foreign object as being magnetically sensitive, preventing the wireless charging transceiver from operating; and responsive to an inconclusive determination, taking an action which is assigned as the default action for an inconclusive determination.

2. The method of claim 1, further comprising the step of:
responsive to a determination that the foreign object is not magnetically sensitive, triggering the wireless charging transceiver to begin operating.

3. The method of claim 1, further comprising the steps of:
determining, by a processor using information from said first identification sensor, that the foreign object may be charged; and responsive to a determination that the foreign object may be charged, triggering the wireless charging transceiver to begin operating.

4. The method of claim 1, wherein the first identification sensor is one of near field communication (NFC) sensor, a radio frequency identification (RFID) sensor, an ultrasound sensor, a Bluetooth transceiver, an optical sensor, and a tactile sensor.

5. The method of claim 1, wherein the wireless charging transceiver transfers power using an air-core transformer, resonant coupling, or strongly coupled resonators.

6. The method of claim 1, wherein determining, by a processor using information from the first identification sensor, whether the foreign object is magnetically sensitive comprises:

receiving, by the processor, a first information from the first identification sensor;

receiving, by the processor, a second information from a second identification sensor, wherein the second identification sensor is a different type of sensor than the first identification sensor; and determining, by the processor, whether the foreign object is magnetically sensitive based on the first information and the second information.

7. The method of claim 1, wherein the information is received via an active communicative electronic circuit on the foreign object.

8. A non-transitory machine-readable medium capable of storing instructions, wherein said instructions, when executed by a processor, cause the processor to perform the steps comprising:

receiving a detection of a foreign object from a first identification sensor at a wireless charging transceiver;

determining, using information from the first identification sensor, whether data on the foreign object is magnetically sensitive;

responsive to a determination that the data on the foreign object identifies the foreign object as being magnetically sensitive, preventing the wireless charging transceiver from operating; and responsive to an inconclusive determination, taking an action which is assigned as the default action for an inconclusive determination.

9. The non-transitory machine-readable medium of claim 8, said instructions further comprising the step of:

responsive to a determination that the foreign object is not magnetically sensitive, triggering the wireless charging transceiver to begin operating.

10. The non-transitory machine-readable medium of claim 8, said instructions further comprising the steps of:
determining, using information from said first identification sensor, that the foreign object may be charged; and
responsive to a determination that the foreign object may be charged, triggering the wireless charging transceiver to begin operating.

11. The non-transitory machine-readable medium of claim 8, wherein the first identification sensor is one of near field communication (NFC) sensor, a radio frequency identification (RFID) sensor, an ultrasound sensor, a Bluetooth transceiver, an optical sensor, and a tactile sensor.

12. The non-transitory machine-readable medium of claim 8, wherein the wireless charging transceiver transfers power using an air-core transformer, resonant coupling, or strongly coupled resonators.

13. The non-transitory machine-readable medium of claim 8, wherein determining, using information from the first identification sensor, whether the foreign object is magnetically sensitive comprises:
receiving a first information from the first identification sensor;
receiving a second information from a second identification sensor, wherein the second identification sensor is a different type of sensor than the first identification sensor; and
determining whether the foreign object is magnetically sensitive based on the first information and the second information.

14. A system comprising:
a first identification sensor;
a wireless charging transceiver; and
a processor configured to:
receive a detection of a foreign object from the first identification sensor at a wireless charging transceiver;
determine, using information from the first identification sensor, whether data on the foreign object is magnetically sensitive;
responsive to a determination that the data on the foreign object identifies the foreign object as being magnetically sensitive, prevent the wireless charging transceiver from operating; and
responsive to an inconclusive determination, taking an action which is assigned as the default action for an inconclusive determination.

15. The method of claim 14, the processor further configured to: responsive to a determination that the foreign object is not magnetically sensitive, trigger the wireless charging transceiver to begin operating.

16. The method of claim 14, the processor further configured to:
determine, using information from said first identification sensor, that the foreign object may be charged; and
responsive to a determination that the foreign object may be charged, trigger the wireless charging transceiver to begin operating.

17. The method of claim 14, wherein the first identification sensor is one of near field communication (NFC) sensor, a radio frequency identification (RFID) sensor, an ultrasound sensor, a Bluetooth transceiver, an optical sensor, and a tactile sensor.

18. The method of claim 14, wherein the wireless charging transceiver transfers power using an air-core transformer, resonant coupling, or strongly coupled resonators.

19. The method of claim 14, wherein the system further comprises a second identification sensor; and determining, using information from the first identification sensor, whether the foreign object is magnetically sensitive further comprises:
receiving a first information from the first identification sensor;
receiving a second information from the second identification sensor, wherein the second identification sensor is a different type of sensor than the first identification sensor; and
determining whether the foreign object is magnetically sensitive based on the first information and the second information.

20. The method of claim 14, wherein the information is received via an active communicative electronic circuit on the foreign object.

* * * * *